United States Patent
Mizukoshi

(10) Patent No.: US 6,971,683 B2
(45) Date of Patent: Dec. 6, 2005

(54) JOINT FOR TUBINGS

(75) Inventor: Hiroshi Mizukoshi, Kanagawa (JP)

(73) Assignee: Flowell Corporation, Kanagawa (JP)

( * ) Notice: Subject to any disclaimer, the term of this patent is extended or adjusted under 35 U.S.C. 154(b) by 117 days.

(21) Appl. No.: 10/624,639

(22) Filed: Jul. 23, 2003

(65) Prior Publication Data

US 2005/0017508 A1    Jan. 27, 2005

(51) Int. Cl.[7] .............................................. F16L 47/00
(52) U.S. Cl. .................. 285/247; 285/354; 285/334.5; 285/386; 285/89
(58) Field of Search ........................... 285/246, 334.5, 285/386, 354, 89, 247

(56) References Cited

U.S. PATENT DOCUMENTS

| | | | | |
|---|---|---|---|---|
| 904,673 A | * | 11/1908 | Bideker | 285/332.3 |
| 1,774,841 A | * | 9/1930 | Parker | 285/334.5 |
| 1,894,700 A | * | 1/1933 | Parker | 285/332.1 |
| 2,863,678 A | * | 12/1958 | Gordon et al. | 285/332.1 |
| 6,022,053 A | * | 2/2000 | Hukuda | 285/331 |
| 6,142,535 A | * | 11/2000 | Nishio et al. | 285/92 |
| 6,334,632 B1 | * | 1/2002 | Nishio et al. | 285/92 |
| 6,776,440 B2 | * | 8/2004 | Nishio | 285/331 |

FOREIGN PATENT DOCUMENTS

| | | | | |
|---|---|---|---|---|
| JP | 1-316591 | * | 12/1989 | F16L 19/08 |
| JP | 6-129576 | * | 5/1994 | F16L 19/04 |
| JP | 6-159574 | * | 6/1994 | F16L 33/22 |
| JP | 07-243564 | | 9/1995 | |

* cited by examiner

Primary Examiner—James M. Hewitt
(74) Attorney, Agent, or Firm—Takeuchi & Kubotera, LLP

(57) ABSTRACT

A joint for tubings with which, in tightening the nut member (20), the friction torque applied to the first end face (32) of the control ring (30) by the bore peripheral face (25) of the internally threaded bore (21) of the nut member (20) is greater than the friction torque applied to the second end face (34) of the control ring (30) by the stopper portion (17) of the joint main body (10, and thus the nut member (20) is reliably turned together with the control ring (30) at the final stage of tightening the nut member (200, which allows the proper initial tightening position of the nut member (20) to be determined.

7 Claims, 6 Drawing Sheets

JOINT FOR TUBINGS

FIELD OF THE INVENTION

The present invention relates to a joint for tubings with which one end of a tubing inserted into an internally threaded bore of a nut member is externally fitted to a joint main body, an internal thread of said nut member being tightened against an external thread of the joint main body for supporting the one end of the tubing. Particularly, the present invention relates to a plastic joint for tubings that is critical in a pipe line for pure water cleaning fluid, chemical solutions, and the like to be used in a clean room at the site for manufacturing of high-density semiconductor chips.

BACKGROUND

As an example of conventional joint for tubings, that which is disclosed in Laid-Open Publication No. 7-243564/1995 can be mentioned.

With such joint for tubings, tightening the nut against the joint main body is completed where both ends of the plastic spacer is brought into contact with the joint main body and the nut, which makes it impossible to turn the spacer by fingers, and if the nut is excessively turned beyond the tightening completion position by means of a wrench or other tightening tool, the nut will press the plastic spacer to deform it, therefore, no excessive stresses will be imposed on the thread, and thus nut tightening operation can be completed without any damage being caused to the joint main body.

The same official gazette also discloses a joint for tubings with which, when both ends of the plastic spacer is brought into contact with the joint main body surface and the nut end, the difference in friction torque applied to both ends of the plastic spacer causes the plastic spacer to be turned together with the nut, and the angular displacement of the outline of the plastic spacer allows the operator to visually and easily know the degree of tightening the nut and complete the tightening operation.

However, these conventional joints for tubings present a problem of that, every time the nut is slightly tightened at the final stage of nut tightening, the operator must try to turn the plastic spacer by fingers to make sure that it will not turn, which makes the nut tightening operation tedious and inefficient.

In addition, there arises another problem of that, if the friction torque applied to the plastic spacer by the nut is greater than the friction torque applied to the plastic spacer by the joint main body, the plastic spacer will be turned together with the nut, which indicates that the nut tightening operation may be completed, however, contrarily, if the friction torque applied to the plastic spacer by the nut is smaller than the friction torque applied to the plastic spacer by the joint main body, the plastic spacer will not always be turned together with the nut at the final stage of nut tightening, therefore, the nut may be undertightened or overtightened, resulting in a trouble, and especially with a plastic joint, the nut will be tightened as much as it is tightened, unlike a metallic joint, thus the joint main body may be damaged if the nut is overtightened.

SUMMARY OF THE INVENTION

The purpose of the present invention accomplished in consideration of the above-mentioned problems which are involved in the prior art is to provide a joint for tubings that causes the nut member and the control ring to be reliably turned together with each other at the final stage of tightening the nut member, and thus allows the proper initial tightening position of the nut member to be determined, which can increase the efficiency of nut tightening operation, and prevent damage to the joint main body.

According to one aspect of the invention there is provided a joint for tubings with which one end of a tubing (T) inserted into an internally threaded bore (21) of a nut member (20) is externally fitted to a joint main body (10), an internal thread of the nut member (20) being tightened against an external thread (13) of the joint main body (10) for supporting the one end of the tubing (T), wherein a control ring (30) which is externally fitted to the external thread (13) of the joint main body (10), and which, in tightening of the nut member (20), can adjust the degree of tightening of the nut member (20), being sandwiched between a stopper portion (17) in the shape of a circular flange that is formed on the rear side of the external thread (13) of the joint main body (10) and the bore peripheral face (25) of the internally threaded bore (21) of the nut member (20); the control ring has a first end face (32) which is brought into contact with the bore peripheral face (25) of the internally threaded bore (21) of the nut member (20), and a second end face (34) which is brought into contact with the stopper portion (17) of the joint main body (10) when said nut member (20) is tightened; and the first end face (32) is formed such that, by making the friction torque which is applied to the first end face (32) by the bore peripheral face (25) of the internally threaded bore (21) greater thin the friction torque which is applied to the second end face (34) by the stopper portion (17), the nut member (20) is turned together with the control ring (30) when the nut member (20) is tightened.

According to another aspect of the invention there is provided a joint for tubings with which one end of a tubing (T) inserted into an internally threaded bore (21) of a nut member (20) is externally fitted to a joint main body (10), an internal thread of the nut member (20) being tightened against an external thread (13) of the joint main body (10) for supporting the one end of the tubing (T), wherein a control ring (30) which is externally fitted to the external thread (13) of the joint main body (10), and which, in tightening of said nut member (20), can adjust the degree of tightening of the nut member (20), being sandwiched between a stopper portion (17) in the shape of a circular flange that is formed on the rear side of the external thread (13) of the joint main body (10) and the bore peripheral face (25) of the internally threaded bore (21) of the nut member (20); the control ring (30) has a first end face (32) which is brought into contact with the bore peripheral face (25) of the internally threaded bore (21) of the nut member (20), and a second end face (34) which is brought into contact with the stopper portion (17) of the joint main body (10) when the nut member (20) is tightened; and the first end face (32) is formed such that, by making the coefficient of friction between the first end face (32) and the bore peripheral face (25) of the internally threaded bore (21) greater than the coefficient of friction between the second end face (34) and the stopper portion (17), the nut member (20) is turned together with the control ring (30) when said nut member (20) is tightened.

According to still another aspect of the invention there is provided a joint for tubings with which one end of a tubing (T) inserted into an internally threaded bore (21) of a nut member (20) is externally fitted to a joint main body (10), an internal thread of the nut member (20) being tightened against an external thread (13) of the joint main body (10) for supporting the one end of the tubing (T), wherein a control ring (30) which is externally fitted to the external thread (13) of the joint main body (10), and which, in tightening of the nut member (20), can adjust the degree of tightening of the nut member (20), being sandwiched between a stopper portion (17) in the shape of a circular flange that is formed on the rear side of the external thread (13) of the joint main body (10) and the bore peripheral face (25) of the internally threaded bore (21) of the nut member (20); the control ring (30) is formed such that, by making the friction torque which is applied by the internally threaded bore (21) greater than the friction torque which is applied by the stopper portion (17), the nut member (20) is turned together with the control ring (30) when the nut member (20) is tightened; and marking portions (36) are consecutively provided in the outer circumferential surface (38) of the control ring (30) at a certain interval along the direction of circumference of the outer circumferential surface (38).

Next, the function of the present invention will be described.

By inserting one end of the tubing (T) into the internally threaded bore (21) of the nut member (20), externally fitting the one end of the tubing (T) to the joint main body (10), and tightening the internal thread (23) of the nut member (20) against the external thread (13) of the joint main body (10), the one end of the tubing (T) is supported. The control ring (30) is kept externally fitted to the external thread (13) of the joint main body (10).

When the nut member (20) is tightened, the control ring (30) is sandwiched between the stopper portion (17) of the joint main body (10) and the bore peripheral face (25) of the internally threaded bore (21) of the nut member (20), and then the first end face (32) of the control ring (30) is contacted with the bore peripheral face (25) of the internally threaded bore (21) of the nut member (20), the second end face (34) of the control ring (30) being contacted with the stopper portion (17) of the joint main body (10).

The first end face (32) and the second end face (34) are formed such that, in tightening the nut member (20), the friction torque which is applied to the first end face (32) by the bore peripheral face (25) of the internally threaded bore (21) is greater than the friction torque which is applied to the second end face (34) by the stopper portion (17), therefore, the nut member (20) is caused to be turned together with the control ring (30). Such co-turning is a phenomenon which occurs when the degree of tightening of the nut member (20) reaches a proper level, and by identifying the angle through which the co-turning has been performed, before completing the operation of tightening the nut member (20), the proper initial tightening position of the nut member (20) can be determined; the tightening operation for the nut member (20) can be performed simply and reliably; occurrence of a trouble due to undertightening or overtightening of the nut member (20) can be prevented; and particularly, damage to the joint main body (10) resulting from overtightening can be avoided.

Specifically, when forming the first end face (32) along the direction of circumference of the bore peripheral face (25) of the internally threaded bore (21), and forming the second end face (34) along the direction of circumference of the stopper portion (17), the diameter of the first end face (32) may be designed to be larger than the diameter of the second end face (34). By doing so, the site of action of a first reaction force which is applied to the first end face (32) by the bore peripheral face (25) of the internally threaded bore (21) is set more distantly from the turning center of the control ring (30) than the site of action of a second reaction force which is applied to the second end face (34) by the stopper portion (17). Because the first reaction force is equal to the second reaction force on the relationship between the action and the reaction, the friction torque based on the first reaction force is greater than the friction torque based on the second reaction force. Therefore, in tightening the nut member (20), the nut member (20) and the control ring (30) are caused to be turned together with each other.

Alternatively, the first end face (32) may be formed such that the total sum of the products of the components of a first reaction force which is applied to the first end face (32) by the bore peripheral face (25) of the internally threaded bore (21) and the distance from the center of the control ring (30) to the site of action of the first reaction force is larger than the total sum of the products of the components of a second reaction force which is applied to the second end face (34) by the stopper portion (17) and the distance from the center of the control ring (30) to the site of action of the second reaction force.

As described above, co-turning can be embodied by specifying the geometries and positions of the first end face (32) and the second end face (34), however, the respective materials for the control ring (30) and the joint main body (10) may be appropriately selected for making the coefficient of friction between the first end face (32) and the bore peripheral face (25) of the internally threaded bore (21), greater than the coefficient of friction between the second end face (34) and the stopper portion (17), thereby allowing the nut member (20) to be turned together with the control ring (30), when the nut member (20) is tightened.

The nut member (20) starting to turn together with the control ring (30) indicates that the degree of the nut member (20) being tightened has reached a proper level, however, in order to perform the tightening operation for the nut member (20) more reliably, it is necessary to identify the angle through which the nut member (20) and the control ring (30) has been turned together with each other. For this, marking portions (36) may be consecutively provided in the outer circumferential surface (38) of the control ring (30) at a certain interval along the circumferential direction. In co-turning, the marking portions (36) are turned together with the control ring (30), and by examining the angle through which the marking portions (36) have been turned, the angle through which the nut member (20) and the control ring (30) have been turned together with each other can be easily known.

The control ring (30) is sandwiched between the nut member (20) and the stopper portion (17) of the joint main body (10), and thus tends to be covered by them, the marking portions (36) tending to be difficult to be viewed, which may make it impossible to easily identify the angle through which the co-turning has been performed.

Then, first, the outer circumferential surface (38) providing a circumference for the first end face (32) is formed such that the diameter of the outer circumferential surface (38) is larger than the outside diameter of the nut member (20), then, cutouts (36) may be consecutively given in the outer circumferential surface (38) of the first end face (32) at a certain interval along the circumferential direction. By doing so, the cutouts (36) are made conspicuous, being not covered by said both, which allows easily knowing the angle through which the co-turning has been performed.

The control ring (30) is generally of a closed annular shape, however, it may be in the shape similar to that of letter C which is partially opened. By forming the control ring (30) in the shape similar to that of letter C, the control ring (30) can be easily removed from the clearance between the nut member (20) and the stopper portion (17) of the joint main body (10) after completion of the tightening operation for the nut member (20). In addition, the partially opened portion of the control ring (30) can be used as a marking portion (36) for identifying the angle through which the co-turning has been performed.

DESCRIPTION OF THE PREFERRED EMBODIMENTS

Figure 1:
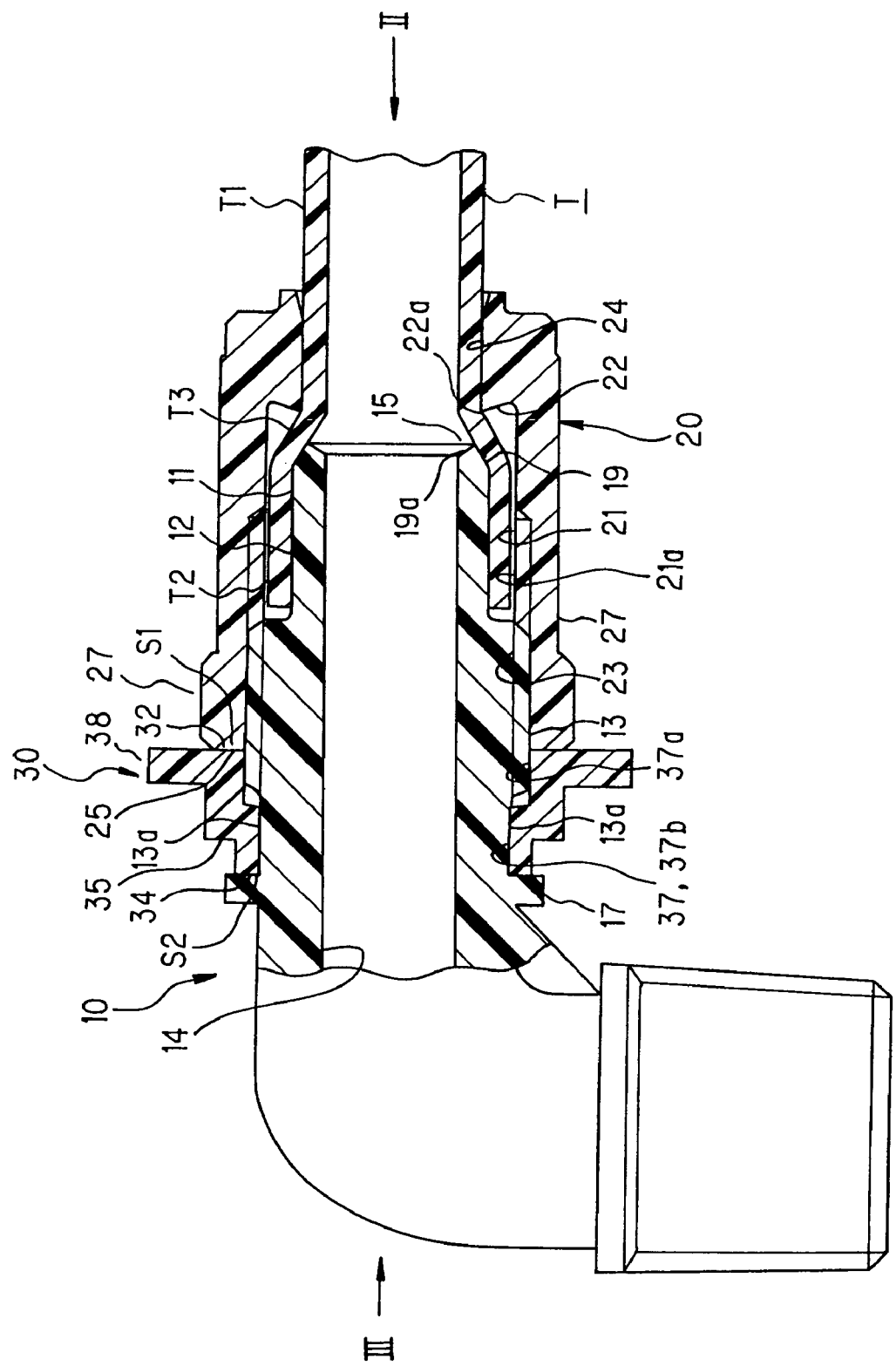
FIG. 1 is a sectional view of the critical portion of a joint for tubings according to one embodiment of the present invention.
Figure 2:
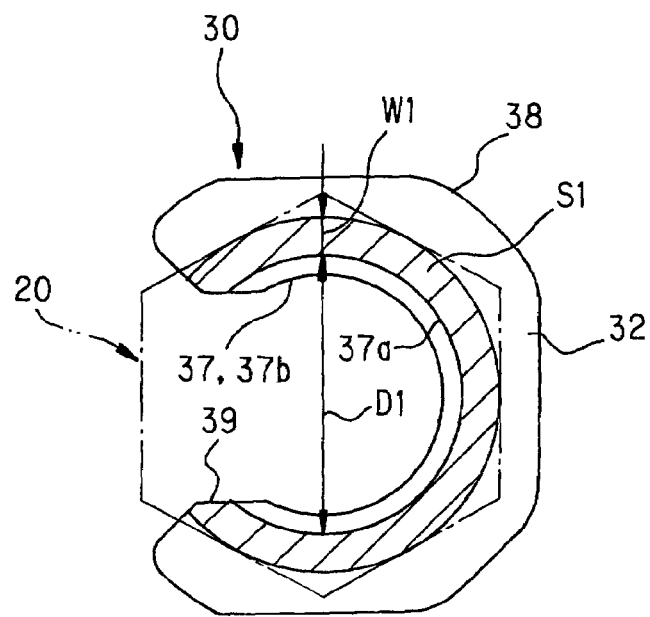
FIG. 2 is a view of a control ring according to the one embodiment of the present invention that is taken in the direction of the arrow H in FIG. 1.

Hereinbelow, one embodiment of the present invention will be described with reference to the drawings. The drawings show the one embodiment of the present invention. FIG. 1 is a sectional view of the critical portion of a joint for tubings according to the one embodiment of the present invention. FIG. 2 is a view of a control ring according to the same embodiment that is taken in the direction of the arrow II in FIG. 1, and FIG. 3 is a view of the control ring that is taken in the direction of the arrow III in FIG. 1.

Figure 3:
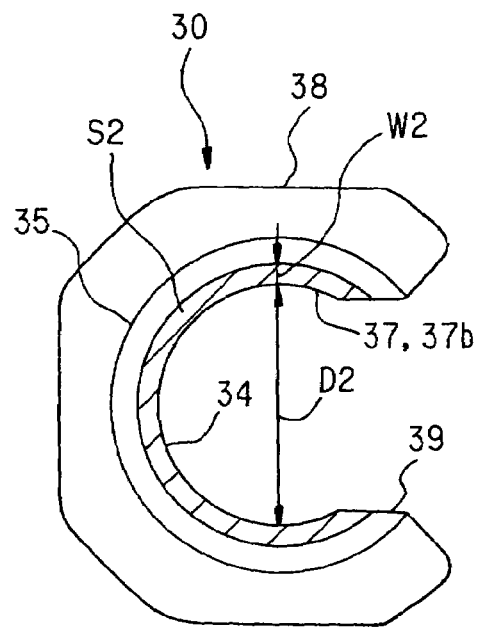
FIG. 3 is a view of the control ring according to the one embodiment of the present invention that is taken in the direction of the arrow m in FIG. 1.
Figure 4:
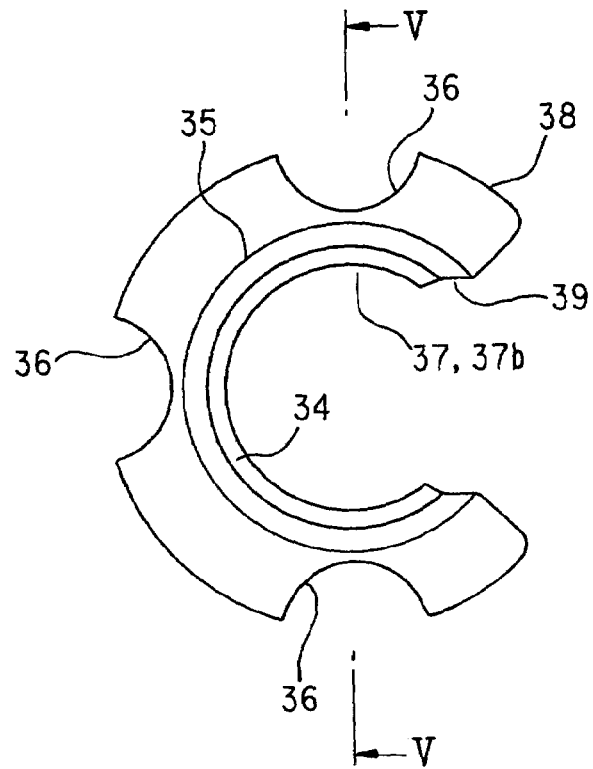
FIG. 4 is a front view of a control ring according to another embodiment of the present invention.
Figure 5:
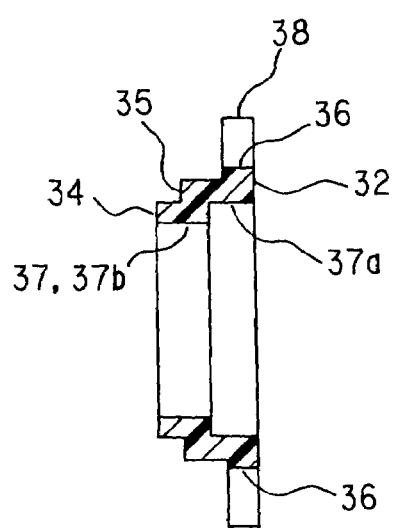
FIG. 5 is a sectional view taken on line V—V in FIG. 4.
Figure 6:
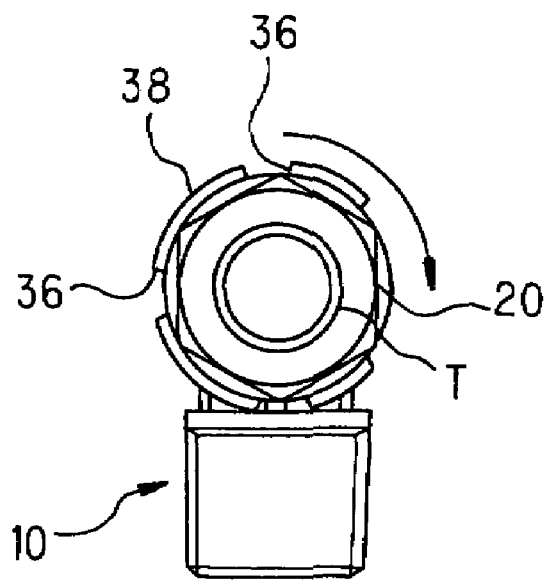
FIG. 6(A) and FIG. 6(B) are explanatory drawings showing the conditions of the control ring according to the another embodiment of the present invention before and after co-turning of the control ring, FIG. 6(A) showing the condition before co-turning, and FIG. 6(B) showing the condition after.
Figure 6:
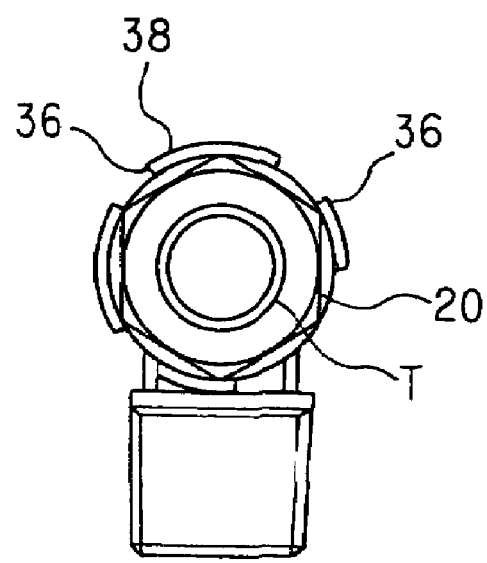

As shown in FIG. 1 to FIG. 3, the joint for a tubing T comprises a joint main body 10, which is made of a fluorocarbon resin, and a nut member 20, which is also made of a fluorocarbon resin. As the fluorocarbon resin, PTFE (polytetrafluoroethylene) and PFA (tetrafluoroethylene-perfluoroalkilvinyl ether copolymer), which are excellent in chemical resistance, can be mentioned.

The nut member 20 is a so-called cap nut, having an innermost recess wall 22 on the rear side of an internally threaded bore 21 thereof, which provides the bottom of the threaded bore that is approximately orthogonal to the thread axis. On the front side of the internally threaded bore 21 of the nut member 20, an internal thread 23 is provided, and in the innermost recess wall 22 of the nut member 20, an insertion hole 24 for inserting a tubing into the internally threaded bore 21 from the innermost recess wall 22 is provided.

The nut member 20 is provided with a tightened portion 27 having an approximately hexagonal section to which a nut tightening tool (wrench) can be fitted. In the joint main body 10, an externally fitted portion 12 is formed in an end portion 11 which is inserted into the rear of the internally threaded bore 21 of the nut member 20. To the externally fitted portion 12, one end of the tubing T which is inserted into the internally threaded bore 21 through the insertion hole 24 of the nut member 20 is fitted with the diameter being expanded. Therefore, the one end of the tubing T which is inserted into the internally threaded bore 21 comprises a general outside diameter portion T1, a larger diameter expanded portion T2, which is externally fitted to the externally fitted portion 12, and a shoulder portion T3 (or flare), which is an intermediate portion connecting between the general outside diameter portion T1 and the expanded diameter portion T2.

In the end portion 11 of the joint main body 10, an external thread 13, which is engaged with the internal thread 23, is provided, following the externally fitted portion 12. The diameter of the thread of the internal thread 23 of the nut member 20, which is engaged with the external thread 13, and the diameter of the bore inner circumferential wall 21a of the internally threaded bore 21 of the nut member 20 are designed to be slightly larger than the outside diameter of the expanded diameter portion T2 such that the expanded diameter portion T2 of the tubing T can be relatively inserted, and the diameter of the thread and the like is at minimum.

On the rear side of the external thread 13 of the joint main body 10, a stopper portion 17 having an approximately hexagonal section is provided. The base end portion of the joint main body 10 forms an elbow portion which is L-shaped bent. In the joint main body 10, a through-hole 14, which passes through along the thread axis, having approximately the same diameter as the bore diameter of the tubing T, is provided.

With the present embodiment, the base portion of the joint main body 10 forms an elbow portion, however, being not limited to this, the base portion of the joint main body 10 may be straight rather than L-shaped bent, or the through-hole 14 may be formed in the shape of T.

When the end portion 11 of the joint main body 10 is inserted into the rear of the internally threaded bore 21 of the nut member 20, the innermost recess wall 22 of the nut member 20 is opposed to a lip portion 15 of the through-hole 14 of the joint main body 10 in the direction parallel to the thread axis. The outer peripheral edge of the lip portion 15 of the through-hole 14 is provided with a chamfered portion 19 such that the one end of the tubing T can be externally fitted with ease, and a stable airtightness can be maintained. The inner peripheral edge of the lip portion 15 is provided with a chamfered portion 19a for prevention of accumulation of liquid, which is a moving medium.

The externally fitted portion 12 of the end portion 11 of the joint main body 10, to which the one end of the tubing T is externally fitted, is provided with a sufficient wall thickness and the required rigidity for minimizing the deformation in the direction of diameter reduction resulting from the tightening force of the nut member 20 in order to prevent the sealing ability from being lowered. On the other hand, the innermost recess wall 22 of the nut member 20 is formed as a biting portion 22a which is directed toward the center line of the insertion hole 24 (center of the thread axis), being inclined at a defined angle (25 deg to 35 deg) toward the lip portion 15 of the through-hole 14 of the joint main body 10 (toward the front side of the internally threaded bore).

When tightening the nut member 20, the external thread 13 of the joint main body 10 is externally fitted with a control ring 30. The control ring 30 is formed in the shape similar to that of C letter which is partially opened. The opened portion 39 thereof is externally fitted from the direction orthogonal to the thread axis of the external thread 13 of the joint main body 10. The control ring 30 is sandwiched between the stopper portion 17 of the joint main body 10 and the bore peripheral face of the internally threaded bore 21 of the nut member 20, allowing the degree of tightening of the nut member 20 to be adjusted.

As the material of the control ring 30, a synthetic resin, such as polypropylene resin, polyethylene resin, and polyvinyl chloride, is used. A fluorocarbon resin, such as PVF, PVDF, ECTFE, PCTFE, ETFE, FEP, PFA, and PTFE, may also be used.

The control ring 30 has a first end face 32, which is brought into contact with the bore peripheral face 25 of the internally threaded bore 21 of the nut member 20, and a second end face 34, which is brought into contact with the stopper portion 17 of the joint main body 10, when the nut member 20 is tightened.

The first end face 32 is formed such that, by making the friction torque which is applied to the first end face 32 by the bore peripheral face 25 of the internally threaded bore 21, greater than the friction torque which is applied to the second end face 34 by the stopper portion 17, the nut member 20 is turned together with the control ring 30, when the nut member 20 is tightened.

Specifically, the first end face 32 is formed along the direction of circumference of the bore peripheral face 25 of the internally threaded bore 21, and the second end face 34 is formed along the direction of circumference of the stopper portion 17, with the diameter D1 of the first end face 32 being designed to be larger than the diameter D2 of the second end face 34. Assuming that the width of the first end face 32 is W1, and the width of the second end face 34 is W2, the contact area S1 (the hatched area in FIG. 2) where the first end face 32 is contacted with the bore peripheral face 25 of the internally threaded bore 21 is approximately equal to $\pi D1 \cdot W1$, and the contact area S2 (the hatched area in FIG. 3) where the second end face 34 is contacted with the stopper portion 17 is approximately equal to $\pi D2 \cdot W2$.

In the second end face 34 of the control ring 30, a shoulder portion 35 is formed. The shoulder portion 35 is located in the larger diameter portion of the second end face 34, being retracted from the stopper portion 17 such that the shoulder portion 35 is not contacted with the stopper portion 17. As a result of this, the portion of the second end face 34 where the second end face 34 is contacted with the stopper portion 17 has a diameter smaller than that of the shoulder portion 35. In the inner circumferential surface 37 of the control ring 30, a first inner circumferential surface 37a and a second inner circumferential surface 37b are formed such that they are externally fitted to the external thread 13 and the neck portion 13a thereof (a portion having a diameter smaller than that of the external thread 13), respectively.

Next, the function of the present embodiment will be described.

One end of the tubing T is inserted into the internally threaded bore 21 through the insertion hole 24 of the nut member 20, and the expanded diameter portion T2 of the one end of the tubing T is externally fitted to the externally fitted portion 12 of the end portion 11 of the joint main body 10. The shoulder portion T3, which connects between the general outside diameter portion T1 and the expanded diameter portion T2 of the tubing T, is flared along the chamfered portion 19 of the externally fitted portion 12 of the joint main body 10. When the end portion 11 of the joint main body 10 is advanced toward the rear side of the internally threaded bore 21 of the nut member 20, the starting end of the external thread 13 of the joint main body 10 is contacted with the starting end of the internal thread 23 of the nut member 20. Then, the expanded diameter portion T2 of the tubing T is relatively advanced with a slight clearance being retained between it and the internally threaded bore 21 (the thread of the internal thread 23 or the bore inner circumferential wall 21a of the internally threaded bore 21) of the nut member 20, or while slide contacting with the internally threaded bore 21.

By fitting a tightening tool to the tightened portion 27 of the nut member 20, and also fitting a tightening tool to the stopper portion 17 of the joint main body 10, and then by relatively turning these tools, the internal thread 23 of the nut member 20 is advanced, being engaged with the external thread 13 of the joint main body 10. With the internal thread 23 of the nut member 20 being fully engaged with the external thread 13 of the joint main body 10, the biting portion 22a of the innermost recess wall 22 of the nut member 20 bites the shoulder portion T3 of the tubing T, thus preventing the tubing T from being dropped off. Further, the tubing T and the chamfered portion 19 of the joint main body 10 are pressed against each other, which results in a high airtightness being obtained.

By inserting one end of the tubing T into the internally threaded bore 21 of the nut member 20, externally fitting the one end of the tubing T to the joint main body 10, and tightening the internal thread 23 of the nut member 20 against the external thread 13 of the joint main body 10, the one end of the tubing T is supported. The control ring 30 is kept externally fitted to the external thread 13 of the joint main body 10.

Before starting the operation of tightening the nut member 20, the opened portion 39 of the control ring 30 is externally fitted to the external thread 13 from the direction orthogonal to the thread axis of the external thread 13 of the joint main body 10. Then, when the internal thread 23 of the nut member 20 is tightened against the external thread 13 of the joint main body 10, the control ring 30 is sandwiched between the stopper portion 17 of the joint main body 10 and the bore peripheral face 25 of the internally threaded bore 21 of the nut member 20, and then the first end face 32 of the control ring 30 is contacted with the bore peripheral face 25 of the internally threaded bore 21 of the nut member 20, the second end face 34 of the control ring 30 being contacted with the stopper portion 17 of the joint main body 10.

In tightening the nut member 20, the friction torque which is applied to the first end face 32 by the bore peripheral face 25 of the internally threaded bore 21 is greater than the friction torque which is applied to the second end face 34 by the stopper portion 17, which causes the nut member 20 to be turned together with the control ring 30, allowing the degree of tightening of the nut member 20 to be adjusted properly.

Specifically, because the diameter of the first end face 32 is designed to be larger than the diameter of the second end face 34, the site of action of a first reaction force which is applied to the first end face 32 by the bore peripheral face 25 of the internally threaded bore 21 is more distant from the turning center of the control ring 30 than the site of action of a second reaction force which is applied to the second end face 34 by the stopper portion 17.

Assuming that the first reaction force and the second reaction force are F1 and F2, respectively, the distance from the turning center of the control ring 30 to the site of action of the first reaction force F1 and the second reaction force F2 are R1 and R2, respectively, and the coefficients of friction for the first end face 32 and the second end face 34 are both $\mu$, the friction torque based on the first reaction force is $\Sigma\mu$F1·R1, and the friction torque based on the second reaction force is $\Sigma\mu$F2·R2.

Here, the coefficient of friction, $\mu$, is a coefficient of static friction; the friction torque based on the first reaction force F1 is the total sum of the products of the components of the first reaction force F1 which is applied to the first end face 32 by the bore peripheral face 25 of the internally threaded bore 21 and the distance R1 from the center (the turning center) of the control ring 30 to the site of action of the first reaction force F1; and the friction torque based on the second reaction force F2 is the total sum of the products of the components of the second reaction force F1 which is applied to the second end face 34 by the stopper portion 17 and the distance R2 from the center of the control ring 30 to the site of action of the second reaction force F2.

In tightening the nut member 20, the first reaction force is equal to the second reaction force (F1=F2) on the relationship between the action and the reaction, and because R1>R2, the friction torque based on the first reaction force ($\Sigma\mu$F1·R1) is greater than the friction torque based on the second reaction force ($\Sigma\mu$F2·R2), resulting in the second end face 34 earlier starting to slip with respect to the stopper portion 17, whereby, in tightening the nut member 20, the nut member 20 and the control ring 30 are caused to be turned together with each other.

By completing the operation of tightening the nut member 20 after confirming that the nut member 20 is turned together with the control ring 30, the proper initial tightening position of the nut member 20 can be determined, which allows the tightening operation for the nut member 20 to be performed simply and reliably. In addition, troubles due to undertightening or overtightening the nut member 20 can be prevented, and especially, damage to the joint main body 10 resulting from overtightening the nut member 20 can be avoided.

Further, when the nut member 20 is turned together with the control ring 30, the opened portion 39 of the control ring 30 provides a marking which allows identifying the angular position reached as a result of the nut member 20 and the control ring 30 being turned together with each other, whereby the operation of tightening the nut member 20 can be performed more reliably.

Once the operation of tightening the nut member 20 is completed, the joint for tubings can be in service, however, the force supporting the tubing may be reduced by the use over a long period of time, therefore, after the service over a certain period of time, the nut member 20 must be retightened to prevent the reduction in supporting force. Before retightening the nut member 20, the control ring 30 must be removed from the external thread 13 of the joint main body 10. In such a case, by relatively passing the external thread 13 of the joint main body 10 through the clearance between the edges of the opened portion 39 of the control ring 30, the control ring 30 can be easily removed from the external thread 13 of the joint main body 10.

On the other hand, when retightening the nut member 20, a control ring 30 for retightening may be placed in the clearance between the nut member 20 and the stopper portion 17. Also in retightening the nut member 20 with the control ring 30 for retightening, the nut member 20 and the control ring 30 must be set such that they are turned together with each other, without fail.

In the above-stated embodiment, the diameter of the first end face 32 of the control ring 30 is designed to be larger than that of the second end face 34, and thus the nut member 20 and the control ring 30 are surely turned together with each other, however, assuming that the coefficients of friction for the first end face 32 and the second end face 34 are $\mu 1$ and $\mu 2$ (where $\mu 1 > \mu 2$), respectively, the friction torque based on the first reaction force ($\Sigma\mu 1$·F1·R1) is greater than the friction torque based on the second reaction force ($\Sigma\mu 2$·F2·R2), even if R1=R2, whereby, in tightening the nut member 20, the nut member 20 and the control ring are turned together with each other.

Further, as shown in FIG. 4 to FIG. 6(B), marking portions are consecutively provided in the outer circumferential surface 38 of the control ring 30 at a certain interval along the circumferential direction. Specifically, in the outer circumferential surface 38 which provides a circumference for the first end face 32, and has a diameter larger than the outside diameter of the nut member 20, cutouts 36 as marking portions may be consecutively given in the outer circumferential surface 38 at a certain interval along the circumferential direction.

When the nut member 20 and the control ring 30 are turned together with each other, the cutouts 36 are turned integrally with the control ring 30. Specifically, the condition of the cutouts 36 is changed over from that before the occurrence of co-turning, which is shown in FIG. 6(A), to that after the occurrence of co-turning, which is shown in FIG. 6(B). By examining the angle through which the cutouts 36 have been turned (approx. 45 deg in FIG. 6(A) and FIG. 6(B)), the angle through which the nut member 20 and the control ring 30 have been turned together with each other can be easily known. Further, by providing the cutouts 36 in the outer circumferential surface 38 having a diameter larger than the outside diameter of the nut member 20, the cutouts 36 are made conspicuous, being not covered by the nut member 20 and the stopper portion 17, which allows easily knowing the angle through which the co-turning has been performed.

Figure 7:
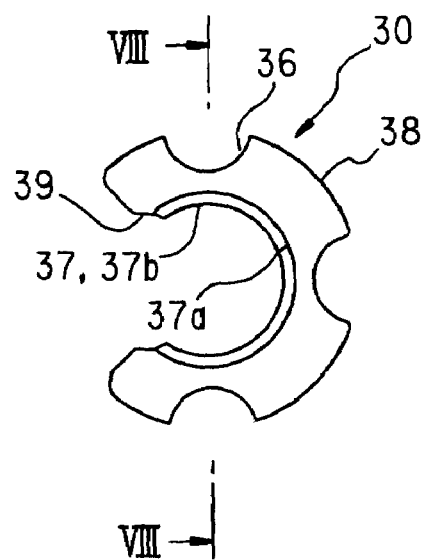
FIG. 7 is a front view of a control ring according to a variant of the embodiment of the present invention.
Figure 8:
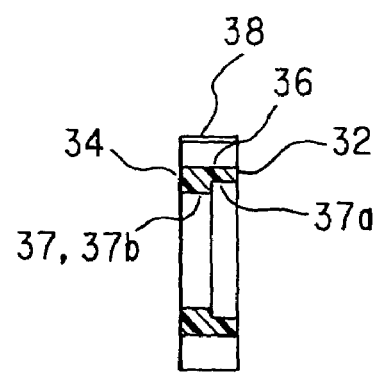
FIG. 8 is a sectional view taken on line VIII—VIII in FIG. 7.
Figure 9:
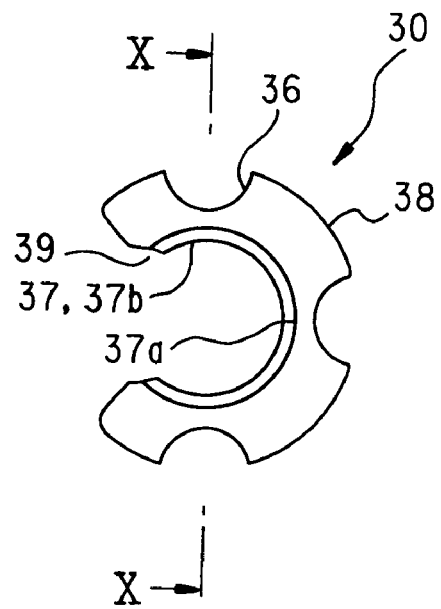
FIG. 9 is a front view of a control ring according to another variant of the embodiment of the present invention.
Figure 10:
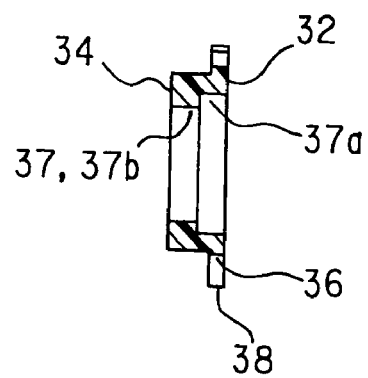
FIG. 10 is a sectional view taken on line X—X in FIG. 9.

FIG. 7 and FIG. 8 show a variant of the above-stated embodiment, FIG. 7 being a front view of the control ring, and FIG. 8 being a sectional view taken on line VIII—VIII in FIG. 7. FIG. 9 and FIG. 10 show another variant of the above-stated embodiment, FIG. 9 being a front view of the control ring, and FIG. 10 being a sectional view taken on line X—X in FIG. 9.

As shown in FIG. 7 to FIG. 10, the second end face 34 has no shoulder portion 35 as is the case with the above-stated embodiment. With these control rings 30, the largest diameters of the first end face 32 and the second end face 34 are approximately equal to each other, while the smallest diameter of the first end face 32 is larger than the smallest diameter of the second end face 34. Therefore, the first reaction force from the bore peripheral face 25 of the internally threaded bore 21 is applied to the first end face 32 of the control ring 30 more concentratedly than to the second end face 34.

Therefore, the friction torque based on the first reaction force is greater than the friction torque based on the second reaction force, which results in the second end face 34 earlier starting to slip with respect to the stopper portion 17, whereby, in tightening the nut member 20, the nut member 20 and the control ring 30 are caused to be turned together with each other.

As described above, with the joint for tubings according to the present invention, the friction torque which is applied to the first end face by the bore peripheral face of the internally threaded bore of the nut member is greater than the friction torque which is applied to the second end face by the stopper portion of the joint main body, in tightening the nut member, therefore, the nut member is caused to be turned together with the control ring at the final stage of tightening the nut member, which allows the proper initial tightening position of the nut member to be determined, the efficiency of nut tightening operation to be improved, and damage to the joint main body to be prevented.

What is claimed is:

1. A joint for tubings with which one end of a tubing inserted into an internally threaded bore of a nut member is externally fitted to a joint main body, an internal thread of said nut member being tightened against an external thread of the joint main body for supporting the one end of the tubing, wherein
    a control ring which is externally fitted to the external thread of said joint main body, and which, in tightening of said nut member, can adjust the degree of tightening of said nut member, being sandwiched between a stopper portion in the shape of a circular flange that is formed on a rear side of the external thread of said joint main body and a bore peripheral face of the internally threaded bore of said nut member;
    said control ring has a first end face which is brought into contact with the bore peripheral face of the internally threaded bore of said nut member, and a second end face which is brought into contact with the stopper portion of said joint main body when said nut member is tightened; and
    said first end face is formed such that, by making the friction torque which is applied to said first end face by the bore peripheral face of said internally threaded bore greater than the friction torque which is applied to said second end face by said stopper portion, said nut member is turned together with said control ring when said nut member is tightened.

2. A joint for tubings with which one end of a tubing inserted into an internally threaded bore of a nut member is externally fitted to a joint main body, an internal thread of said nut member being tightened against an external thread of the joint main body for supporting the one end of the tubing, wherein
    a control ring which is externally fitted to the external thread of said joint main body, and which, in tightening of said nut member, can adjust the degree of tightening of said nut member, being sandwiched between a stopper portion in the shape of a circular flange that is formed on a rear side of the external thread of said joint main body and a bore peripheral face of the internally threaded bore of said nut member;
    said control ring has a first end face which is brought into contact with the bore peripheral face of the internally threaded bore of said nut member, and a second end face which is brought into contact with the stopper portion of said joint main body when said nut member is tightened; and
    said first end face is formed such that, by making the coefficient of friction between said first end face and the bore peripheral face of said internally threaded bore greater than the coefficient of friction between said second end face and said stopper portion, said nut member is turned together with said control ring when said nut member is tightened.

3. A joint for tubings with which one end of a tubing inserted into an internally threaded bore of a nut member is externally fitted to a joint main body, an internal thread of said nut member being tightened against an external thread of the joint main body for supporting the one end of the tubing, wherein
    a control ring which is externally fitted to the external thread of said joint main body, and which, in tightening of said nut member, can adjust the degree of tightening of said nut member, being sandwiched between a stopper portion in the shape of a circular flange that is formed on a rear side of the external thread of said joint main body and a bore peripheral face of the internally threaded bore of said nut member;
    said control ring is formed such that, by making the friction torque which is applied by said internally threaded bore greater than the friction torque which is applied by said stopper portion, said nut member is turned together with said control ring when said nut member is tightened; and
    marking portions are consecutively provided in the outer circumferential surface of said control ring at a certain interval.

4. The joint for tubings of claim 1, 2 or 3, wherein
    said first end face is formed along the circumference of the bore peripheral face of said internally threaded bore;
    the second end face is formed along the circumference of said stopper portion; and
    the diameter of said first end face is designed to be larger than the diameter of said second end face.

5. The joint for tubings of claim 1, 2 or 3, wherein
    said first end face is formed along the circumference of the bore peripheral face of said internally threaded bore;
    said second end face is formed along the circumference of said stopper portion; and
    said first end face is formed such that the total sum of the products of the components of a first reaction force which is applied to the first end face by the bore peripheral face of said internally threaded bore and the distance from the center of said control ring to the site of action of said first reaction force is larger than the total sum of the products of the components of a second reaction force which is applied to said second end face by said stopper portion and the distance from the center of said control ring to the site of action of said second reaction force.

6. The joint for tubings of claim 3, wherein the outer circumferential surface of said control ring is formed such that the outside diameter of said control ring is larger than the outside diameter of said nut member; and
    said marking portions are cutouts formed in the outer circumferential surface of said control ring.

7. The joint for tubings of claim 1, 2 or 3, wherein said control ring is formed in the shape similar to that of letter C which is partially opened.

* * * * *